US009465430B2

(12) United States Patent
Shiah et al.

(10) Patent No.: US 9,465,430 B2
(45) Date of Patent: Oct. 11, 2016

(54) MEMORY WITH VARIABLE OPERATION VOLTAGE AND THE ADJUSTING METHOD THEREOF

(71) Applicants: INDUSTRIAL TECHNOLOGY RESEARCH INSTITUTE, Hsinchu (TW); Etron Technology, Inc., Hsinchu (TW)

(72) Inventors: Chun Shiah, Hsinchu (TW); Bor-Doou Rong, Hsinchu (TW)

(73) Assignees: INDUSTRIAL TECHNOLOGY RESEARCH INSTITUTE, Hsinchu (TW); ETRON TECHNOLOGY, INC., Hsinchu (TW)

( * ) Notice: Subject to any disclaimer, the term of this patent is extended or adjusted under 35 U.S.C. 154(b) by 0 days.

(21) Appl. No.: 14/286,432

(22) Filed: May 23, 2014

(65) Prior Publication Data

US 2014/0351609 A1  Nov. 27, 2014

Related U.S. Application Data

(60) Provisional application No. 61/826,979, filed on May 23, 2013.

(30) Foreign Application Priority Data

May 23, 2014 (TW) .............................. 103118173 A

(51) Int. Cl.
*G06F 1/26* (2006.01)
*G06F 1/32* (2006.01)

(52) U.S. Cl.
CPC ........... *G06F 1/3275* (2013.01); *G06F 1/3296* (2013.01); *Y02B 60/1228* (2013.01); *Y02B 60/1285* (2013.01)

(58) Field of Classification Search
CPC ...... G06F 1/26; G06F 1/3275; G06F 713/30; G06F 365/226
See application file for complete search history.

(56) References Cited

U.S. PATENT DOCUMENTS

| 7,523,373 | B2 | 4/2009 | Russell et al. |
| 7,765,418 | B2 | 7/2010 | Mann et al. |
| 7,978,525 | B2 | 7/2011 | Yuan et al. |
| 2005/0024911 | A1* | 2/2005 | Kim ........................ G11C 5/14 365/100 |
| 2009/0003117 | A1 | 1/2009 | Jeong et al. |
| 2010/0162020 | A1 | 6/2010 | Maule et al. |

(Continued)

OTHER PUBLICATIONS

Kihwan Choi et al., Dynamic Voltage and Frequency Scaling based on Workload Decomposition, Department of EE-Systems, University of Southern California, Los Angeles, CA.

(Continued)

*Primary Examiner* — James G Norman
(74) *Attorney, Agent, or Firm* — Locke Lord LLP; Tim Tingkang Xia, Esq.

(57) ABSTRACT

A memory with variable operation voltage is disclosed. The disclosed DRAM comprises a core memory module, a register, and a first voltage adjustment module. The core memory module operates with a first control voltage. The register is used for storing a plurality of control signals and selecting one among the control signals as a voltage control signal according to an input signal. The first voltage adjustment module is respectively electrically connected to the register, the core memory module, and an external voltage, so as to provide the first control voltage according to the voltage control signal and the external voltage.

13 Claims, 6 Drawing Sheets

(56) References Cited

U.S. PATENT DOCUMENTS

| | | | | |
|---|---|---|---|---|
| 2013/0093505 A1* | 4/2013 | Gupta | ................. | G05F 1/575 327/540 |
| 2013/0279276 A1 | 10/2013 | Schaefer | | |
| 2014/0032941 A1* | 1/2014 | Kajigaya | ................. | G06F 1/26 713/300 |

OTHER PUBLICATIONS

Tajana Simunic et al., Dynamic Voltage Scaling and Power Management for Portable Systems, 524-529, Stanford University, University of Bologna.

Johan Pouwelse et al., Dynamic Voltage Scaling on a Low-Power Microprocessor, 251-259, Faculty of Information Technology and Systems Delft University of Technology, The Netherlands.

Howard David et al., Memory Power Management via Dynamic Voltage/Frequency Scaling, 1-10, Intel Corp., Carnegie Mellon University.

Hitoshi Tanaka et al., Sub-1-μA Dynamic Reference Voltage Generator for Battery-Operated DRAM's, IEEE Journal of Solid-State Circuits, 1994, 448-453, vol. 29, No. 4.

Trevor Pering et al., The Simulation and Evaluation of Dynamic Voltage Scaling Algorithms, 76-81, University of California Berkeley Electronics Research Laboratory.

Intellectual Property Office, Ministry of Economic Affairs, R. O. C, "Office Action", Sep. 11, 2015, Taiwan.

* cited by examiner

MEMORY WITH VARIABLE OPERATION VOLTAGE AND THE ADJUSTING METHOD THEREOF

CROSS REFERENCE TO RELATED APPLICATION

This application claims the priority benefit of Taiwan application Ser. No. 103118173, filed on May 23, 2014 and claims the priority benefit of U.S. provisional application Ser. No. 61/826,979, filed on May 23, 2013. The entirety of the above-mentioned patent application is hereby incorporated by reference herein and made a part of this specification.

TECHNICAL FIELD

The technical field relates to a memory with variable operation voltage and the adjusting method thereof.

BACKGROUND

Dynamic random access memories (DRAMs) are indispensable to a variety of computing devices. In general, a DRAM operates at fixed power and fixed frequency. When a computing device operates in a power saving mode, although an external voltage provided for the DRAM is decreased, the consuming power and the operation frequency are not dramatically decreased due to the circuit structure inside the DRAM. When the computing device is in a high power efficiency mode, although the external voltage provided for the DRAM is increased, the consuming power and the operation frequency are not dramatically increased due to the aforementioned reasons. Thus, that the power and the operation frequency could be adjusted for the DRAMs based on requirements is needed.

SUMMARY OF THE DISCLOSURE

The exemplary embodiments of the disclosure provide a memory with variable operation voltage and the adjusting method thereof. According to an exemplary embodiment, the register in the DRAM is a mode register complying with the specification established by Joint Electron Device Engineering Council (JEDEC). According to an input instruction signal, the mode register outputs the corresponding control signal for dynamically adjusting reference voltage of an internal voltage regulator, so as to adjust the operation frequency and power of the DRAM.

An exemplary embodiment relating to a memory with variable operation voltage comprises: a first core memory module for accessing a first data with a first control voltage; a register for storing a plurality of control signals and selecting one among the control signals as a voltage control signal according to an input signal, wherein the register complies with the specification established by the JEDEC; and a first voltage adjustment module respectively electrically connected to the register, the core memory module, and an external voltage, so as to provide the first control voltage according to the voltage control signal and the external voltage.

Another embodiment relating to an operation voltage adjustment method for a memory comprises: providing an external voltage; generating a control signal according to a lookup table and an input signal; and acquiring power from the external voltage and providing a first control voltage to a core memory module by a first voltage adjustment module according the control signals.

Another embodiment relating to a memory with variable operation voltage comprises: a plurality of core memory modules; a plurality of peripheral circuitries; a register complying with the specification established by the JEDEC, for storing a plurality of control signals; and a voltage adjustment module respectively electrically connected to the register, the core memory modules, the peripheral circuitries, and an external voltage, so as to provide control voltages for the core memory modules and the peripheral circuitries according to the control signals and the external voltage.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
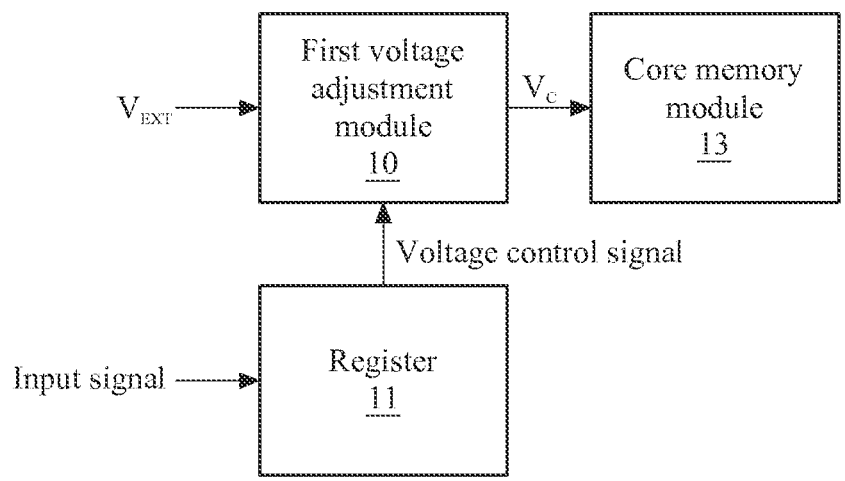
FIG. 1 illustrates a function block of dynamic random access memories in accordance with an exemplary embodiment.

The following paragraphs, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 shows a functional block diagram of a dynamic random access memory (DRAM) in accordance with an exemplary embodiment. As shown in FIG. 1, the DRAM 1 comprises a first voltage adjustment module 10, a register 11 and a core memory module 13, wherein the first voltage adjustment module 10 is electrically connected between the register 11 and the core memory module 13.

The core memory module operates with a first control voltage to access data. For example, the first control voltage could be the bit line voltage carried on a bit line. With increasing or decreasing the first control voltage, the core memory module 13 could achieve a faster access operation with higher power consumption, or achieve lower power consumption with a slower access operation.

The register 11 is used for storing a plurality of control signals and selecting one among control signals as a voltage control signal according to an input signal. According to an exemplary embodiment, the register 11 in the DRAM 1 is a mode register complying with the specification established by Joint Electron Device Engineering Council, JEDEC. The register 11 comprises a first register block and a second register block. In accordance with the specification of the mode register, the first register block stores a plurality of operation mode data related to the core memory module 13. In a general mode register, there is a register block which is reserved for the mode register for further extended use. This register block is the second register block mentioned in this disclosure. In the second register block, a plurality of control signals and a lookup table used for selecting an output among the plurality of control signals in accordance with an input signal are stored. The lookup table contains corresponding relationships between the input signals and the voltage control signals. Therefore, when an input signal is received by the register 11, the register 11 selects one among a plurality of control signals as a voltage control signal for outputting in accordance the above-mentioned lookup table.

Figure 2:
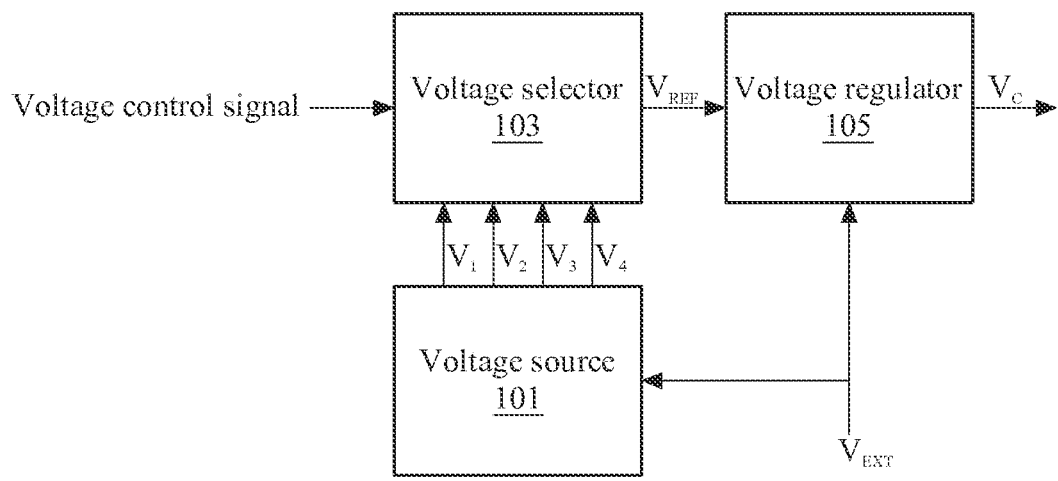
FIG. 2 illustrates a functional block diagram of a first voltage tuning module in accordance with an exemplary embodiment.

The first voltage adjustment module 10 is electrically connected to the register 11, the core memory module 13 and an external voltage $V_{EXT}$. So as to provide a first control voltage according the voltage control signal and an external voltage. For example, FIG. 2 shows a functional block diagram of a first voltage adjustment module. As shown in FIG. 2, the first voltage adjustment module 10 comprises a voltage source 101, a voltage selector 103 and a voltage regulator 105. The voltage selector 103 is electrically connected to the voltage source 101 and the register 11 while the voltage regulator 105 is electrically connected to the voltage selector 103 and the core memory module 13, respectively.

Figure 3A:
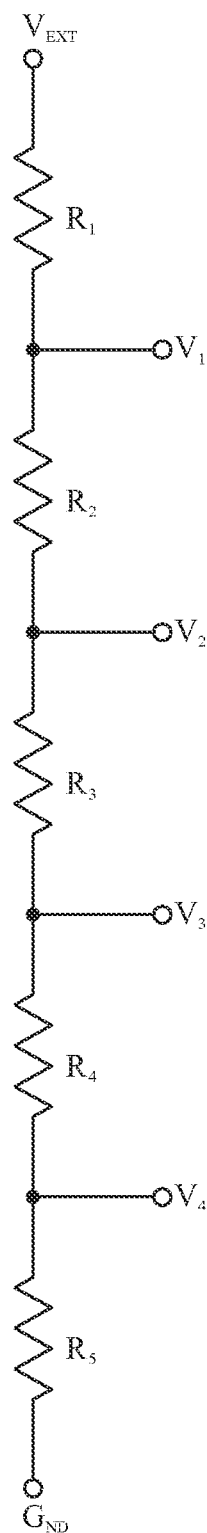
FIG. 3A illustrates a schematic circuit drawing of a voltage source in accordance with an exemplary embodiment.
Figure 3B:
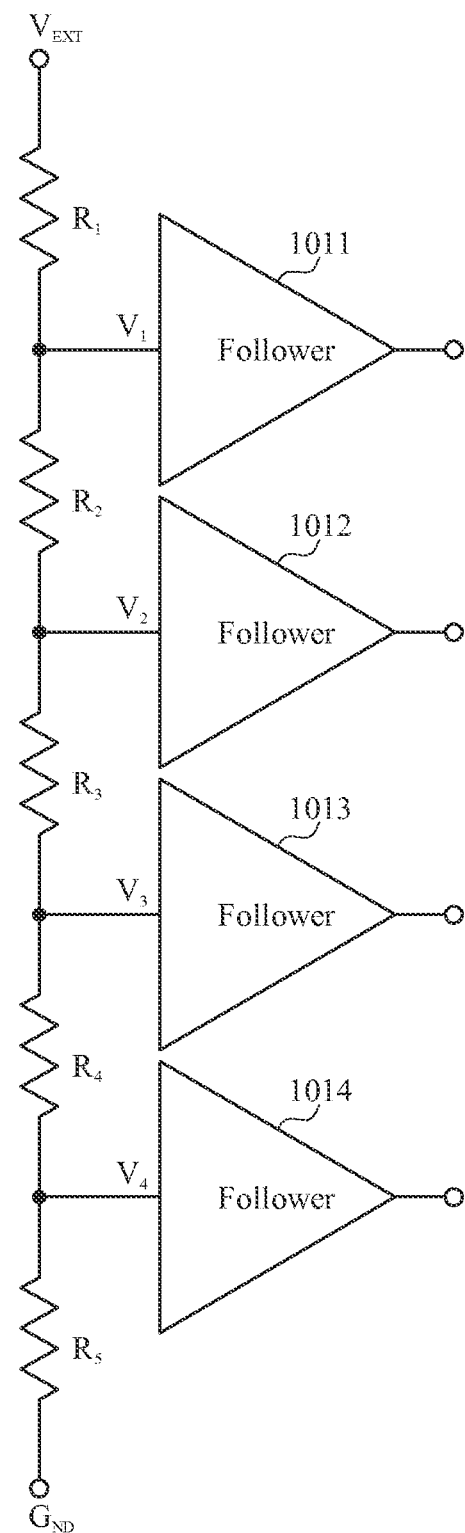
FIG. 3B illustrates a schematic circuit drawing of a voltage source in accordance with another exemplary embodiment.

The voltage source 101 is used to provide a plurality of voltages. In an exemplary embodiment, FIG. 3A shows a schematic circuit of a voltage source according to an exemplary embodiment. As shown in FIG. 3, the voltage source 101 could provide several voltages, $V_1$-$V_4$, by connecting resistors $R_1$ to $R_5$ in series between an external voltage $V_{EXT}$ and a ground terminal $G_{ND}$ with Voltage Division Rule (VDL). In another exemplary embodiment, FIG. 3B shows a schematic circuit of a voltage source according to another exemplary embodiment. As shown in FIG. 3B, the voltage source 101 could further comprise followers, 1011 to 1014, connected to nodes of the resisters, so that the voltages, $V_1$ to $V_4$ could be isolated from kickback noise caused by an external circuit.

The voltage selector 103 is used for selectively connecting one of the voltages provided by voltage source 101 to the voltage regulator 105 as a reference voltage for the voltage regulator 105. In an exemplary embodiment, the voltage selector 103 could comprise a plurality of switches (E.g. Complementary Metal-Oxide-Semiconductor switch, CMOS switch). One node of each switch is connected to the voltage source 101 while the other node of that switch is connected to the voltage regulator 105. These switches are controlled by the aforementioned voltage control signal. By adjustment on one of these switches, one of the voltages provided by voltage source 101 is selectively connected to the voltage regulator 105 as a reference voltage VREF.

Figure 4:
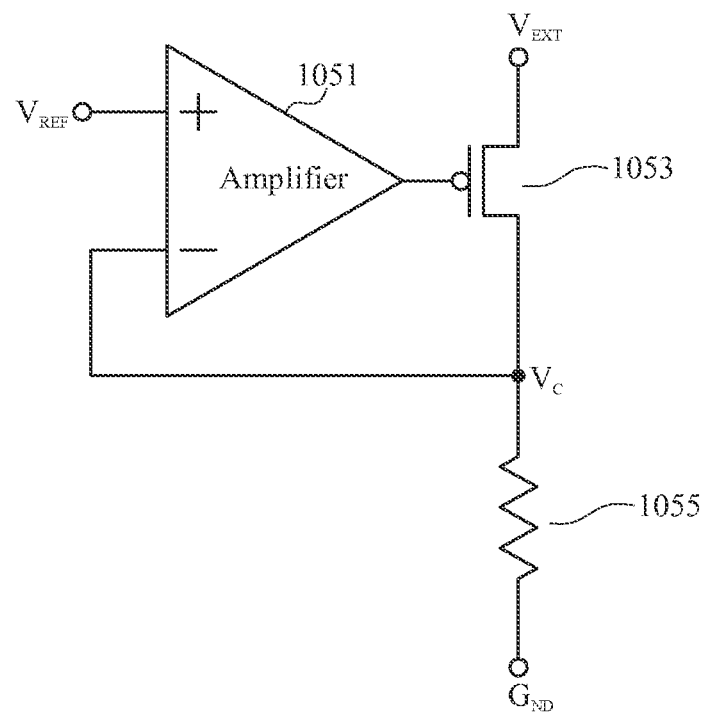
FIG. 4 illustrates a schematic circuit drawing of a voltage regulator in accordance with an exemplary embodiment.

The voltage regulator 105 (also called clamper circuit) is electrically connected to voltage selector 103 and the core memory module 13, so as to provide a first control voltage $V_C$ to the core memory module 13 according to the external voltage $V_{EXT}$ and the reference voltage VREF. FIG. 4 shows a schematic circuit diagram of a voltage regulator according to an exemplary embodiment. As shown in FIG. 4, the voltage regulator 105 comprises an amplifier 1051, an analog switch 1053 and an impedance element 1055. The positive input node of the amplifier 1051 is electrically connected to the VREF, while the negative input node is connected the first control voltage $V_C$. The analog switch 1053 is three-node element comprising a control node, a first node and second node. The control node of the analog switch 1053 is connected to the output node of the amplifier 1051. The first node of the analog switch 1053 is connected to a voltage source, for example an external voltage $V_{EXT}$, while the second node of the analog switch 1053 is electrically connected to the core memory module 13 for providing the first control voltage $V_C$. According to an exemplary embodiment, the impedance element 1055 could be a resistor whose two nodes are respectively a third node and a fourth node. The third node is connected the second node while the fourth node is connected to the ground terminal $G_{NB}$. By use of this structure, the amplifier 1051 amplifies the deference between the reference voltage $V_{REF}$ and the first control voltage $V_C$ to generate a current control signal for the output node, so as to control the quantity of the electric current flowing through the analog switch 1053. The electric current flowing through the analog switch 1053 also flows through the impedance element 1055. Therefore, there is voltage difference between the two nodes of the impedance element 1055, which is equivalent to the first control voltage $V_C$. Therefore, there is voltage difference between the two nodes of the impedance element 1055, which is equivalent to the first control voltage $V_C$.

Figure 5:
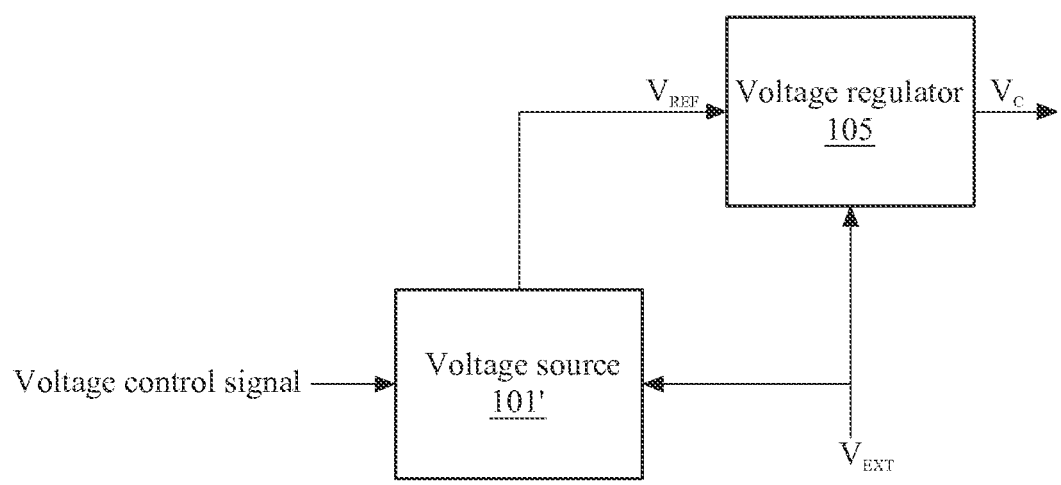
FIG. 5 illustrates a functional block diagram of a first voltage adjustment module in accordance with an exemplary embodiment.

For the implementation, the first voltage adjustment module could be implemented with other circuit structures. For example, FIG. 5 shows a functional diagram of a first voltage adjustment module according to an exemplary embodiment. As shown in FIG. 5, the first voltage adjustment module 10' comprises a voltage source 101' and the voltage regulator 105. The voltage source 101' is electrically connected to the register 11 while the voltage regulator 105 is electrically connected to the voltage source 101' and the core memory module 13.

Figure 6:
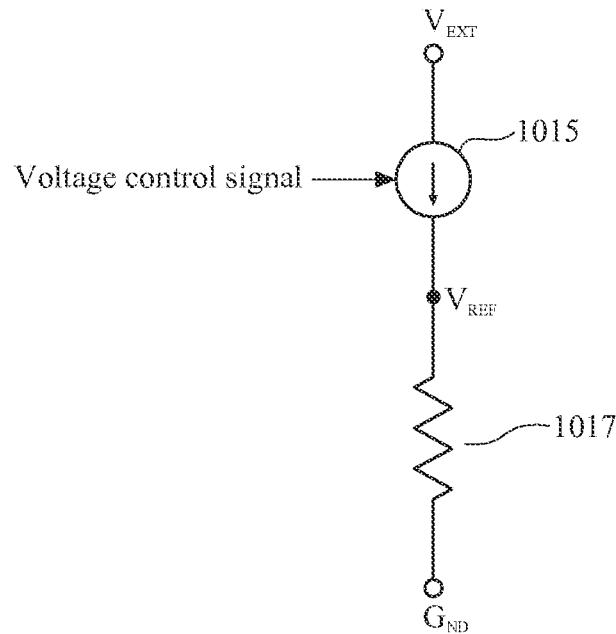
FIG. 6 illustrates a schematic circuit drawing of a voltage source in accordance with an exemplary embodiment.

FIG. 6 shows a schematic circuit diagram of a voltage source according to an exemplary embodiment. As shown in FIG. 6, the voltage source 101' comprises a current source 1015 and an impedance element 1017. The current source 1015 could be seen as a three-node element. The first node of the current source 1015 is connected to the external voltage $V_{EXT}$ while the control node of the current source 1015 is connected to the register 11. The quantity of the reference current flowing through the current source 1015 is determined by the voltage control signal. The impedance element 1017, for example, is a resister whose one node is connected to the ground terminal $G_{ND}$ and the other node is connected to the second node of the current source 1015. A voltage difference is formed between two nodes of the impedance element 1017 by the reference current flowing through the impedance element 1017. The second node of the current source 1015, which is connected to the node of the voltage regulator 105, could be seen as the reference voltage $V_{REF}$ controlled by a voltage control signal.

Figure 7:
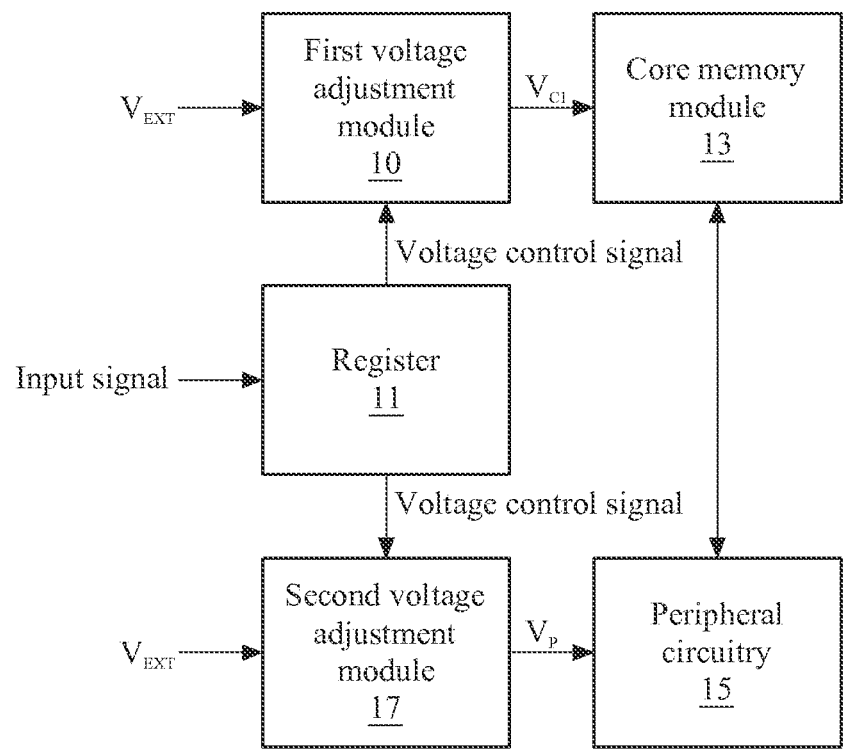
FIG. 7 illustrates a functional block diagram of dynamic random access memories in accordance with another exemplary embodiment.

FIG. 7 shows a functional block diagram of a dynamic random access memory (DRAM) in accordance with another exemplary embodiment. As shown in FIG. 7, comparing with the DRAM shown in FIG. 1, the DRAM 1' further comprises a peripheral circuitry 15 and a second voltage adjustment module 17. In general, the core memory module of the DRAM 1' comprises a memory cell, a sense amplifier, a word line, a bit line, etc. the peripheral circuitry could comprise an input/output interface circuit or address decoder. The second voltage adjustment module 17 is electrically connected to the register 11 and the peripheral circuitry 15, while the peripheral circuitry 15 is connected to the core memory module 13. In this embodiment, the first voltage adjustment module 10 is adjusted to provide the first control voltage $V_{C1}$ for the core memory module 13 according to the voltage control signal and the external voltage $V_{EXT}$. For example, the first control voltage $V_{C1}$ is used to control or drive the voltage of a sense amplifier, a word line or a bit line.

The peripheral circuitry 15 is used to access the data in the core memory module 13 according to the access instruction from a device in an operation environment. Therefore, the operation voltage of the peripheral circuitry 15 is adjusted according to the operation voltage of other devices in the operation environment. For example, while an operation voltage of a central processing unit (CPU) is decreased, the operation voltage of the peripheral circuitry 15 is also decreased. On the contrary, while an operation voltage of a CPU is increased, the operation voltage of the peripheral circuitry 15 is also increased. Accordingly, a second voltage adjustment module 17 used for adjusting voltage is needed for the peripheral circuitry 15 to accordingly provide the second control voltage $V_P$ for peripheral circuitry 15 as an operation voltage, while the operation voltages of other devices outside the DRAM 1' is changed. For example, the second control voltage $V_P$ can be used to control or drive the voltage of the DRAM's interface circuit.

The structure and the operation manner of the second voltage adjustment module 17 is approximately the same as the aforementioned first voltage adjustment module 10. What the difference is that the manner a reference voltage varying with a voltage control signal in the second voltage adjustment module 17 is slightly different from the manner a reference voltage varying with a voltage control signal in the second voltage adjustment module 17.

Figure 8:
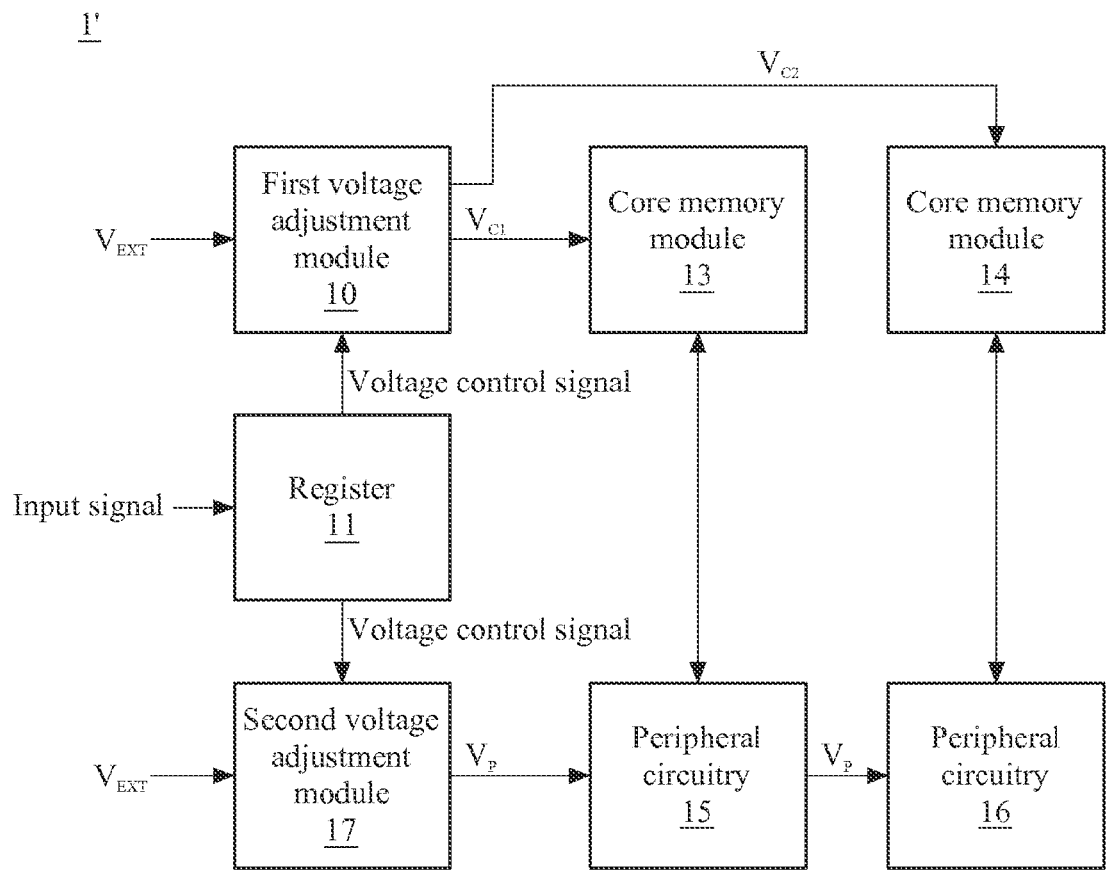
FIG. 8 illustrates a functional block diagram of dynamic random access memories in accordance with another exemplary embodiment.

FIG. 8 shows a functional block diagram of a dynamic random access memory (DRAM) in accordance with another exemplary embodiment. As shown in FIG. 8, comparing with the embodiment shown in FIG. 7, the DRAM 1' in FIG. 8 further comprises a core memory module 14 and a peripheral circuitry 16. The peripheral circuitry 15 and the peripheral circuitry 16 are responsible to respectively access the data in the core memory module 13 and in the core memory module 14 according to the access instruction from external devices. Accordingly, the peripheral circuitry 15 and the peripheral circuitry 16 use the same control voltage, the second control voltage $V_P$. In this embodiment, the input signal could comprise an operation voltage of an external device (E.g. CPU) and needed signals for the core memory module 13 and core memory module 14. For example, the input signal indicates that the operation voltage of an external device is 2.5V and the core memory module 13 is needed to operate at a higher operation frequency. According to the input signal, the register 11 could control the second voltage adjustment module 17 to provide the second control voltage $V_P$, which is in coordination with the operation voltage of the external device, for the peripheral circuitry 15 and the peripheral circuitry 16. In addition, the first voltage adjustment module 10 in this embodiment comprises two voltage selectors and two voltage regulators. The first voltage adjustment module 10 can be controlled by the register 11 to increase the first control voltage $V_{C1}$ provided for the core memory module 13 and to decrease the third control voltage $V_{C2}$ provided for the core memory module 14. On the whole, a plurality of core memory modules in the same DRAM is provided with different voltages in accordance with the needs to operate properly based on request.

The DRAM comprises a plurality of core memory modules and a plurality of peripheral circuitries. The register could store related data for grouping the plurality of core memory modules. The register can also store related data and the control voltages for different groups of core memory modules. The control voltages needed for different groups of core memory modules can be the same or can be different. Furthermore, the register can also store related data and adjust the working frequencies for different groups of core memory modules. In another word, according to the control signal, the DRAM respectively provides a first working frequency for a first group and a second working frequency for a second group, wherein the first working frequency for a first group and the second working frequency for a second group can be the same or can be different.

Figure 9:
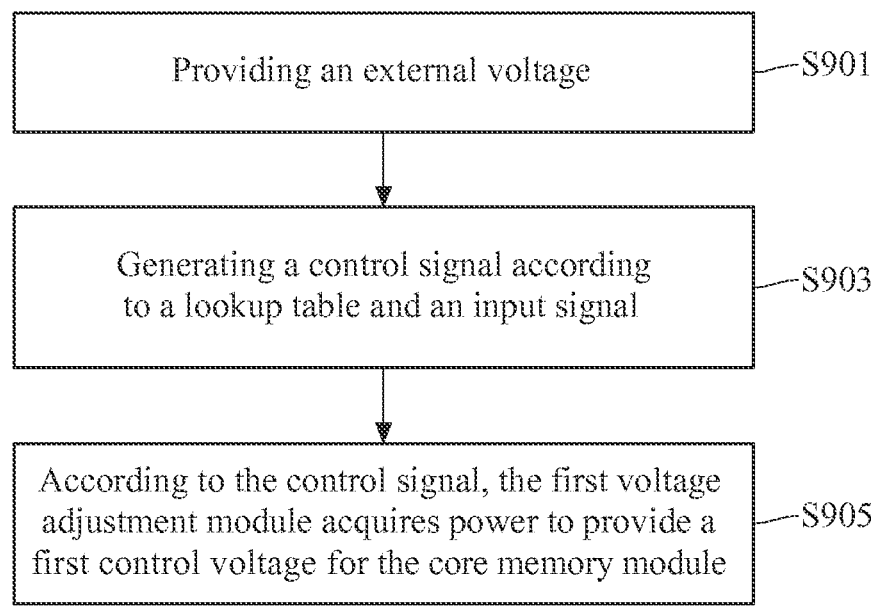
FIG. 9 illustrates an operation flow chart of dynamic random access memories of power adjustment method in accordance with another exemplary embodiment.

The register can store related data used to group a plurality of peripheral circuitry. The register can also store related data and store control voltages of the plurality of peripheral circuitry. In general, the control voltages of the plurality of peripheral circuitry are the same. In conclusion, the operation process of the DRAM in accordance with aforementioned embodiment could derive a power adjustment method for a DRAM. FIG. 9 shows a flowchart of a power adjustment method for a DRAM according to an exemplary embodiment. As shown in step S901, an external voltage is provided by a system. As shown in step S903, a control signal is generated by the register according to a lookup table stored in the register and an input signal provided by the system. As shown in step S905, according to the control signal, the first voltage adjustment module acquires power to provide a first control voltage for the core memory module.

In accordance with the DRAM disclosed in this disclosure, there is a register block which is reserved for the mode register for further extended use. A general voltage regulator is modified as a voltage adjustment module to adjust a reference voltage. The corresponding adjustments are provided for voltages of the plurality modules in DRAM. Therefore, the consuming power and the operation frequency of the DRAM are adjusted according the instructions carried by input signals.

Although, this disclosure only provide the exemplary embodiments of voltage adjustments for the bit line in the core memory module and for the peripheral circuitry. However, the person having ordinary skill in the art acknowledges that the technique disclosed in this disclosure can be used to adjust other voltages in the core memory module. Although, the voltage of one core memory module is adjusted in this disclosure, the voltages of several core memory modules can also be adjusted simultaneously, or adjusted respectively It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A memory with variable operation voltage, comprising:
   a first core memory module operated by a first control voltage for accessing a first data;
   a register for storing a plurality of control signals and selecting one among the control signals as a voltage control signal according to an input signal, wherein the register complies with a specification established by Joint Electron Device Engineering Council (JEDEC), wherein the register is different from the first core memory and the input signal is not determined according to the first control voltage; and
   a first voltage adjustment module electrically connected to the register, the first core memory module and an external voltage, respectively, so as to provide the first control voltage according to the voltage control signal and the external voltage, so that the first control voltage is adjustable according to the voltage control signal, wherein the first voltage adjustment module comprises:
      a first voltage source for draining power from the external voltage to provide a plurality of first voltages according to the external voltage; and
      a first voltage regulator for draining power from the external voltage to output the first control voltage according to a first reference voltage;
      wherein the first reference voltage is one among the plurality of first voltages.

2. The memory according to claim 1, wherein the first voltage adjustment module further comprises:
   a first voltage selector electrically connected to the register, the first voltage source and the first voltage regulator, respectively, for electrically connecting one of the plurality of first voltages to the first voltage regulator as the first reference voltage.

3. The memory according to claim 1, further comprising:
   a peripheral circuitry electrically connected to the first core memory module for accessing the first data in the core memory module according an access instruction; and
   a second voltage adjustment module electrically connected to the register, a first peripheral circuitry and an external voltage signal, respectively, for providing a second control voltage to the first peripheral circuitry according to the voltage control signal and the external voltage.

4. The memory according to claim 3, further comprising:
   a second core memory module for accessing a second data with a third control voltage; and
   a second peripheral circuitry electrically connected the second core memory module and the second voltage adjustment module for accessing the second data in the second core memory module according to the access instruction;
   wherein first voltage adjustment module electrically connected the second core memory module provides the third control voltage according the voltage control signal and the external voltage signal, and the second voltage adjustment module provides the second control voltage to the second peripheral circuitry.

5. The memory according to claim 3, wherein the second voltage adjustment module comprises:
   a second voltage source for providing a plurality of second voltages;
   a second voltage regulator for outputting the second control voltage according to a second reference voltage and the external voltage; and
   a second voltage selector electrically connected to the register, the second voltage source and the second voltage regulator, respectively, for electrically connecting one of the plurality of second voltages to the second voltage regulator as the second reference voltage.

6. The memory according to claim 1, further comprises a voltage selector electrically connected to the voltage source for selecting one among the first voltages as the first reference voltage according to the voltage control signal, wherein the first voltage regulator comprises:
   an amplifier electrically connected to the voltage selector for generating a current control signal according to the first reference voltage and the first control voltage;
   an analog switch electrically connected to the external voltage and the amplifier for an current acquired from the external voltage according to the current control signal; and
   an impedance element electrically connected to the analog switch and a ground terminal for generating the first control voltage with the current.

7. The memory according to claim 1, wherein the first voltage source comprises:
   a current source having a first node and a second node connected to the external voltage, electrically connected to the register for adjusting a reference current according to the voltage control signal; and
   an impedance element having a third node connected to the second node and a fourth node connected to a ground terminal;
   wherein a voltage difference between the second node and the ground terminal defines the first reference voltage, while a reference current flows through the impedance element.

8. The memory according to claim 1, wherein the register is a mode register comprising:
   a first register block for a plurality of operation mode data related to the core memory module; and
   a second register block for storing the control signals and a lookup table comprising a corresponding relationship between the input signal and the voltage control signal.

9. The memory according to claim 1, wherein the first voltage source comprises:
   a plurality of resisters connected in series between the external voltage and a ground terminal for providing the voltages.

10. A memory with variable operation voltage, comprising:
    a plurality of core memory modules;
    a plurality of peripheral circuitries;
    a register complying with a specification established by Joint Electron Device Engineering Council (JEDEC), for storing a plurality of control signals; and
    a voltage adjustment module respectively electrically connected to the register, the core memory modules, the peripheral circuitries, and an external voltage, so as to provide control voltages for the core memory modules and the peripheral circuitries according to the control signals and the external voltage, wherein the voltage adjustment module comprises:
       a first voltage source for draining power from the external voltage to provide a plurality of first voltages according to the external voltage; and a first voltage regulator for draining power from the external voltage to output one among the control voltages according to a first reference voltage;

wherein the first reference voltage is one among the plurality of first voltages.

11. The memory according to claim 10, wherein the memory divides the core memory modules into a first group and a second group according the control signals of the register, the voltage adjustment module provides the control voltages for the first group and the control voltages for the second group according the control signals and the external voltage, wherein the control voltages for the first group could be different from the control voltages for the second group.

12. The memory according to claim 10, wherein the memory divides the core memory modules into a first group and a second group according the control signals of the register, the register provides a first working frequency for the first group and a second working frequency for the second group according to the control signals.

13. The memory according to claim 10, wherein the memory divides the core memory modules into a first peripheral circuitry group and a second peripheral circuitry group according the control signals of the register, the voltage adjustment module provides the control voltages for the first peripheral circuitry group and the control voltages for the second peripheral circuitry group according the control signals and the external voltage, wherein the control voltages for the first peripheral circuitry group are the same as the control voltages for the second peripheral circuitry group.

* * * * *